United States Patent [19]
Karlsson et al.

[11] 4,061,288
[45] Dec. 6, 1977

[54] RING-SHAPED LINE PROTECTING ELEMENT FOR USE IN FISHING REELS

[75] Inventors: Jarding Urban Karlsson; Hugo Ragnvald Svensson, both of Svangsta, Sweden

[73] Assignee: ABU Aktiebolag, Svangsta, Sweden

[21] Appl. No.: 690,062

[22] Filed: May 26, 1976

[30] Foreign Application Priority Data

May 27, 1975 Sweden .............................. 7506000

[51] Int. Cl.² .......................................... A01K 89/00
[52] U.S. Cl. ........................ 242/84.1 K; 242/84.2 R
[58] Field of Search .................. 242/84.1 K, 84.1 R, 242/84.2 R, 84.2 A, 84.21 R, 84.21 A, 118, 118.4 R, 118.7

[56] References Cited

U.S. PATENT DOCUMENTS

| | | | |
|---|---|---|---|
| 2,783,952 | 3/1957 | Clay | 242/84.21 R |
| 2,884,211 | 4/1959 | Holahan, Jr. | 242/84.1 K |
| 2,973,916 | 3/1961 | Shakespeare | 242/84.2 R |
| 3,329,371 | 4/1967 | Willis et al. | 242/84.2 A |

Primary Examiner—Billy S. Taylor
Attorney, Agent, or Firm—Karl W. Flocks

[57] ABSTRACT

A ring-shaped line protecting element intended for use in fishing reels and adapted to be mounted on the outer edge or rim of the end wall of a line spool, in the area between said end wall rim and a part of the reel surrounding said end wall, wherein the line protecting element comprises a ring of elastic material which is split at a point and which in a free condition has a maximum outer diameter greater than the inner diameter of said surrounding part of the reel so that the ring, after being mounted in position between the respective spool end wall and the surrounding part, is kept resiliently engaged with the surrounding part.

5 Claims, 3 Drawing Figures

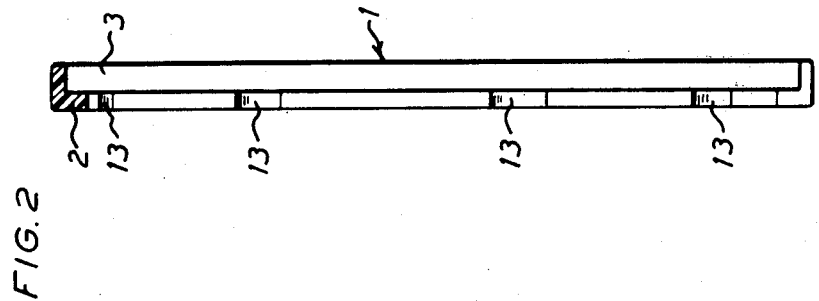
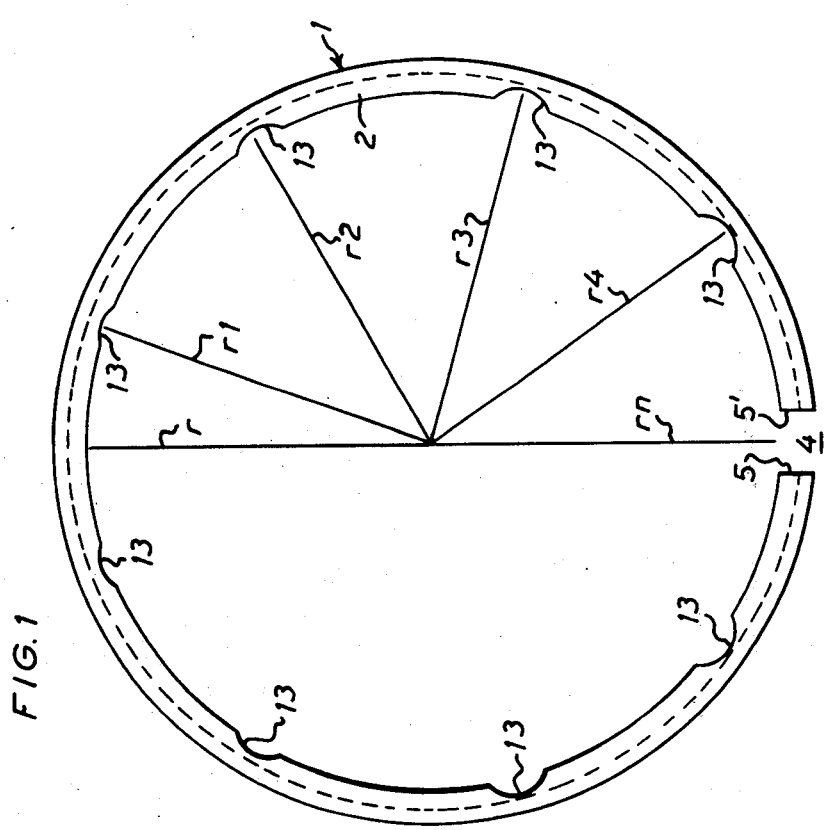

RING-SHAPED LINE PROTECTING ELEMENT FOR USE IN FISHING REELS

The present invention relates to a ring-shaped line-protecting element intended for use in fishing reels and adapted to be mounted on the outer edge or rim of the end wall of a line spool, in the area between said end wall rim and a part of the fishing reel surrounding said end wall, in order to prevent the line from cutting in between said line spool end wall and said part.

A problem in connection with fishing reels is that the necessary clearance between the spool end walls and the surrounding part of the fishing reel may give the line a possibility of cutting in between either end wall and the surrounding part, which may result in the line being damaged or tied up on some element of the reel. It is already known to overcome this problem in non-rotary type fishing reels by arranging a line protecting element in the form of felt strips or elastic rings which are mounted on the spool end walls and take up the radial play between the spool end walls and the surrounding part. Even if such known line protecting elements are satisfactory for non-rotary type reels it does not follow that they are satisfactory for spinning type reels. In non-rotary type reels the spool is stationary, but the spool of a spinning reel is rotated by means of the crank when retrieving the line and it is rotated (at a very high speed) by the line when the bait is cast or when the fish rushes. The problem with the line getting tangled on the spool and loops of line cutting in between the spool and the casing therefore is much more frequent in spinning reels. Another problem encountered in fishing reels having a rotary spool is that the spool, due to a small axial bearing play, travels axially to and fro during its rotation, which may give rise to line loops tending to be fed in between an end wall and the spool casing, and if a reel casing surface around a spool end wall is not perfectly coaxial with respect to the circumferential edge of the spool end wall, there are formed local radial play variations where the line will be more apt to cut in and these are difficult to eliminate by means of conventional line protecting elements.

The invention has for its object to overcome inconveniences of this kind by providing a line protecting element which is particularly apt for use in fishing reels with a rotary spool but may be used to great advantage also in fishing reels with a fixed spool, and is economical in manufacture and is simply mounted.

These objects have been achieved by the present invention, wherein the line protecting element comprises a ring of elastic material which is divided at a point and which in free condition has a maximum outer diameter greater than the inner diameter of said surrounding part of the fishing reel so that the ring after being mounted in position between the respective spool end wall and the surrounding part is kept resiliently engaged with the surrounding part. Other characteristic features and advantages of the fishing reel of this invention will be apparent from the following description and claims.

In addition to the advantage of eliminating the abovementioned inconveniences of fishing reels having a rotary spool, the invention achieves the advantage that fishing without inconvenience can be carried out with a line which is thinner than the lines required for conventional spinning reels, and the invention also permits greater tolerances for spool and casing. The line protecting element according to the invention therefore is very efficient also in large type fishing reels, such as deep-sea fishing reels.

The invention will be described more fully hereinafter with reference to the accompanying drawings, in which:

FIG. 1 is a plan view of a preferred embodiment of a line protecting ring according to the invention;

FIG. 2 is an axial sectional view of the ring of FIG. 1; and

Figure 3:
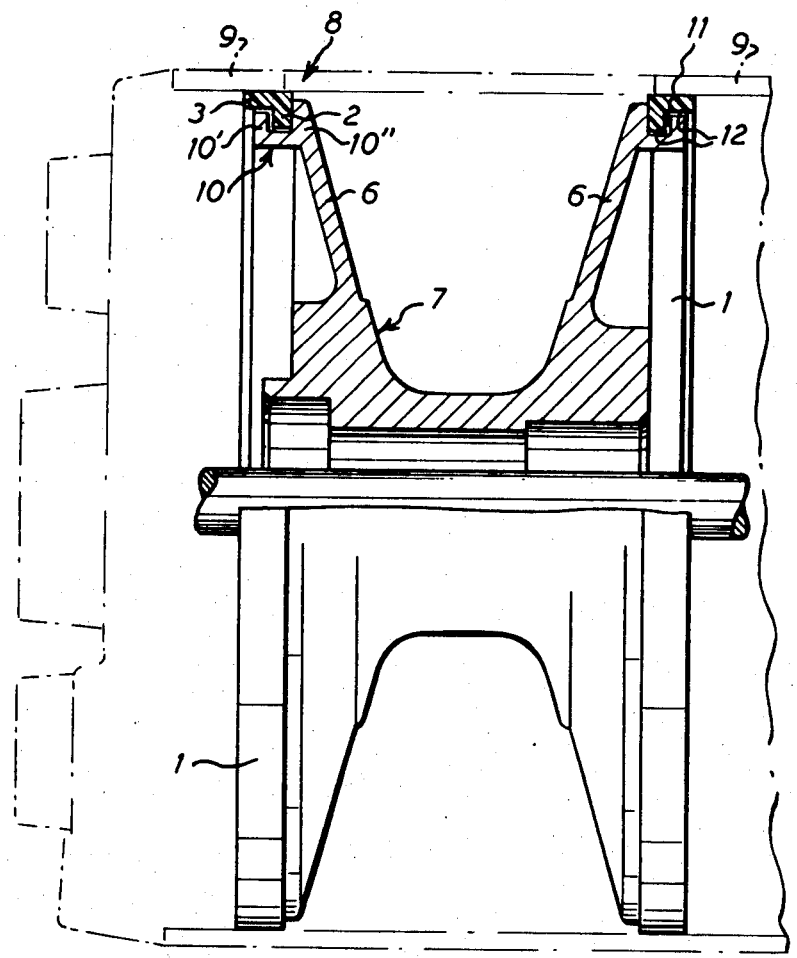
FIG. 3 is a fragmentary view of a deep-sea fishing reel equipped with line protecting rings according to the invention between the spool end walls and the casing.

In the preferred embodiment shown in FIGS. 1 and 2 the line protecting ring 1 is of generally L-shaped cross-section i.e. it consists of a radial web 2 with an outer axially oriented flange 3. The ring is not completely closed but divided at a point, as shown at the gap designated 4 between the adjacent ends 5, 5' of the ring. The ring 1 is of such configuration that it is fully circular only when the ends 5, 5' are brought together so that the ring is substantially closed. In free condition (FIG. 1) the ring 1 has successively increasing diameters $r_1$, $r_2$ ....... $r_n$, as counted from the radius $r$ which is diametrically positioned relative to that radius $r_n$ which extends to the dividing point 4 between the ring ends 5, 5'. In the embodiment shown the end faces 5, 5' are perpendicular to the plane of the ring but, if desired, the ends may be of oblique or bevelled configuration so as to match each other when the ring is pressed together to assume a generally circular shape between a spool end wall rim and a surrounding casing part.

The ring 1 should consist of such a material and be of such a design that, after being mounted in proper position on a spool end wall 6 (see FIG. 3) and after the spool 7 has been mounted in the reel casing 8, the ring will tend to spring outwardly into engagement with a part 9 surrounding each end wall, said part being a portion of the casing in the example shown. The material should of course also be durable and resistant to water (including salt water). According to the preferred embodiment the ring 1 is moulded of a suitable plastics material, such as acetate plastics, which has the desired properties.

As shown in FIG. 3 the spool end wall 6 has, at its circumferential outer edge or rim, a ring-shaped seat 10 including a groove which the web 2 of the ring 1 engages. The width of said groove is slightly greater than the thickness of the web 2 so that a small axial clearance 11 is obtained between the ring web 2 and the two spool end wall flanges 10', 10" on either side of the seat groove. This will allow the spool 7 to travel slightly axially in lateral direction without being prevented by the ring 1. In free condition (FIG. 1) the ring 1 has its maximum inner diameter in the zone of the dividing point 4, and this diameter is greater than the innner diameter of said casing part 9 so that the rings 1 of elastic material, after being mounted in position on the spool end walls 6 and after the spool 7 has been mounted into the casing 8, will spring outwardly into engagement with the surrounding part 9. In this position the inner edge of the ring web 2 has a small radial clearance 12 relative to the bottom of the seat groove, which permits the spool to rotate freely relative to the line protecting rings 1 the axial positions of which are defined by the seat grooves, i.e. the ring web 2 is kept in a middle position for any axial travel of the spool during rotation.

An important aspect of the line protecting ring of the invention is that it is designed to provide an even spring action and to be apt to follow any irregularities of the surrounding part 9 (in this case the reel casing). To this end the ring according to the embodiment shown is provided with a number of notches 13 spaced at equal angular distances from each other around the ring, as counted from the dividing point 4. The notches 13 positioned on either side of the dividing point 4 are the deepest ones and the other notches have a depth which successively decreases with the distance from the dividing point. In the embodiment shown the ring is provided with eight notches 13, said notches and the dividing point 4 (which partially has the same function as the notches) are spaced from each other at an angle of 40° around the ring. In the embodiment shown the notches 13 are considered to be (or really are) formed by means of a rotary tool whose position relative to the inner edge of the ring web 2 determines the depth of the notches 13 during their formation.

The notches 13 need of course not necessarily be carried out by a particular processing operation but may be formed as the ring is made by moulding and, instead of the notches 13 shown, it is possible to arrange other equivalent weakening portions which impart to the ring the desired adaptability to irregularities of the casing or surrounding part 9. Another possibility lies in shaping the ring or ring web with decreasing thickness towards the dividing point 4, but for manufacture-technical reasons and for the purpose of obtaining a satisfactory flexible adaptabilty, the described arrangement of notches appears to be the best one. The ring may also have another section than that shown, such as T-, I- or solid V- or wedge section, or the ring may quite simply have the web 2 shaped as in FIG. 2 (i.e. without any axial flange). According to another conceivable modification, the ring may be of substantially inverted U-section, whereby it can be mounted on and embrace a simpler spool end wall rim than that shown in FIG. 3. In this case both the ring flanges facing the spool should have opposite notches 13 or equivalent weakening portions for the adaptability described. These and other similar modifications fall within the scope of the invention according to the appended claims.

What we claim and desire to secure by Letters Patent is:

1. A line protecting element for use in fishing reels with a line spool having circular end walls and with a surface surrounding at least one of said end walls of the line spool in spaced relation thereto,
    said line protecting element comprising
        a split ring of elastic material, said ring being formed and dimensioned to be seated on the end wall of the end wall of the line spool and, in the seated position, to substantially close the space between the end wall and the surrounding surface, said elastic split ring being shaped to have, in a free condition of the ring, two facing, spaced apart ends where said ring is split and a spring rigidity which varies along said ring, and said split ring being formed to be non-circular in free condition and having, in said free condition, a maximum radius in the area of the split portion of said ring and a decreasing radius in both directions away from said area of maximum radius to a minimum radius in the zone opposite said area, and said ring being so shaped that, when bringing together said facing ends to a substantially closed annular form, in the form said ring is to have in position of use, it is generally circular and owing to its natural tendency to spring outwardly and its varying spring rigidity, adapts itself to said surrounding surface irrespective of minor non-circularity thereof.

2. A line protecting element as claimed in claim 1, wherein the ring in its inner peripheral edge is provided with a plurality of spaced apart recesses distributed around its periphery for providing said varying spring rigidity of the ring.

3. A line protecting element as claimed in claim 2, wherein said recesses are in the form of edge notches having a depth successively decreasing with the distance from said facing ends of the split ends.

4. A line protecting element as claimed in claim 2, wherein the ring has an inverted L-section and the recesses are formed with a varying depth in the inner flange of the inverted L-section.

5. A line protecting element as claimed in claim 1, for use in fishing reels, in which the spool has an end wall rim arranged as a seat for said ring, wherein the inner edge portion of said ring is so shaped and dimensioned that said ring in position of use has both a small axial clearance and a small radial clearance with respect to the spool end wall, so that said ring, which, due to its outward spring action, bears against the surrounding surface of the reel, offers the least possible frictional resistance to the rotation of the spool, at the same time as the spool end wall keeps the ring in position.

* * * * *